Jan. 20, 1959 J. D. BROWN 2,869,595
TABLE FOR BAND SAWS
Original Filed Jan. 27, 1955 5 Sheets-Sheet 1
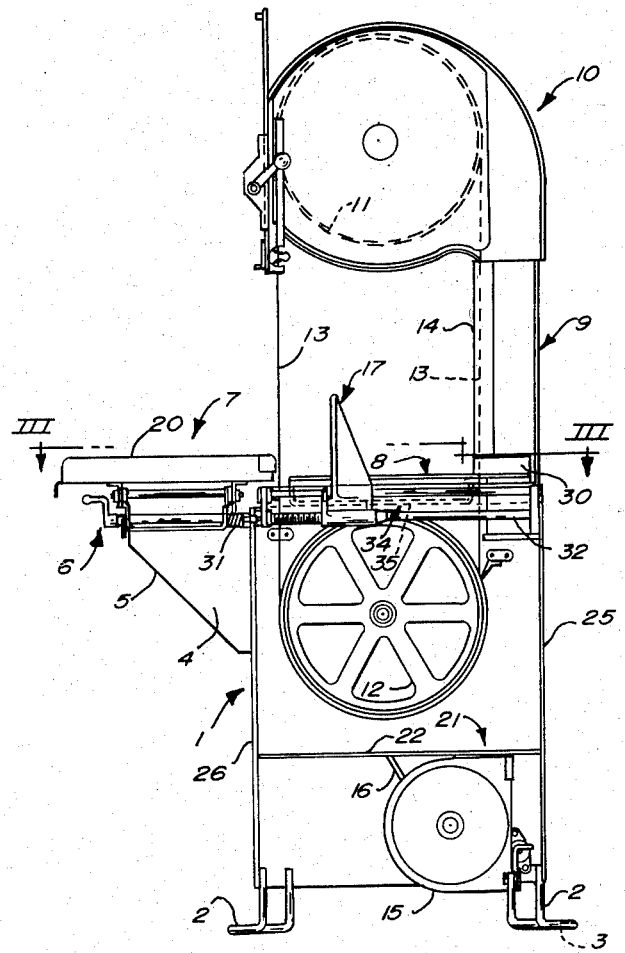
Fig. I
INVENTOR.
JAMES D. BROWN
BY
Marshall, Marshall + Yeasting
ATTORNEYS

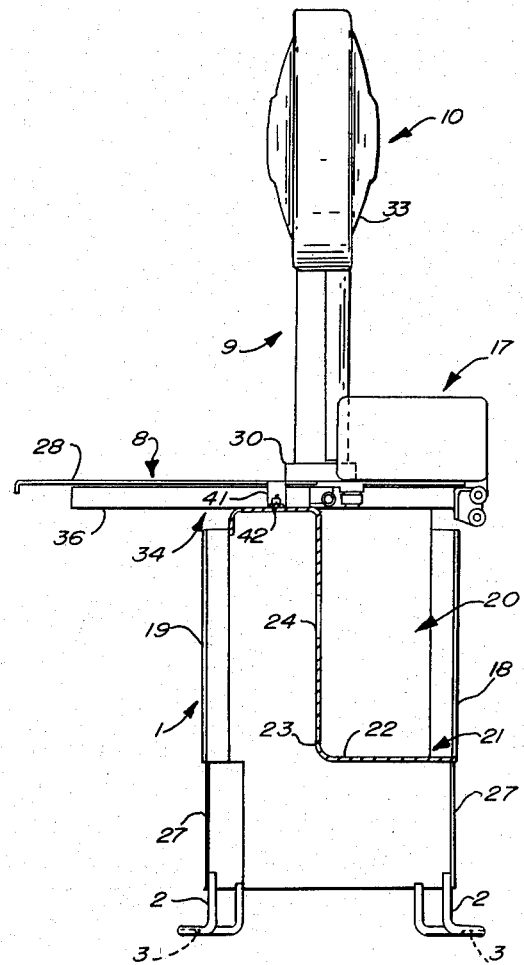
Fig. II

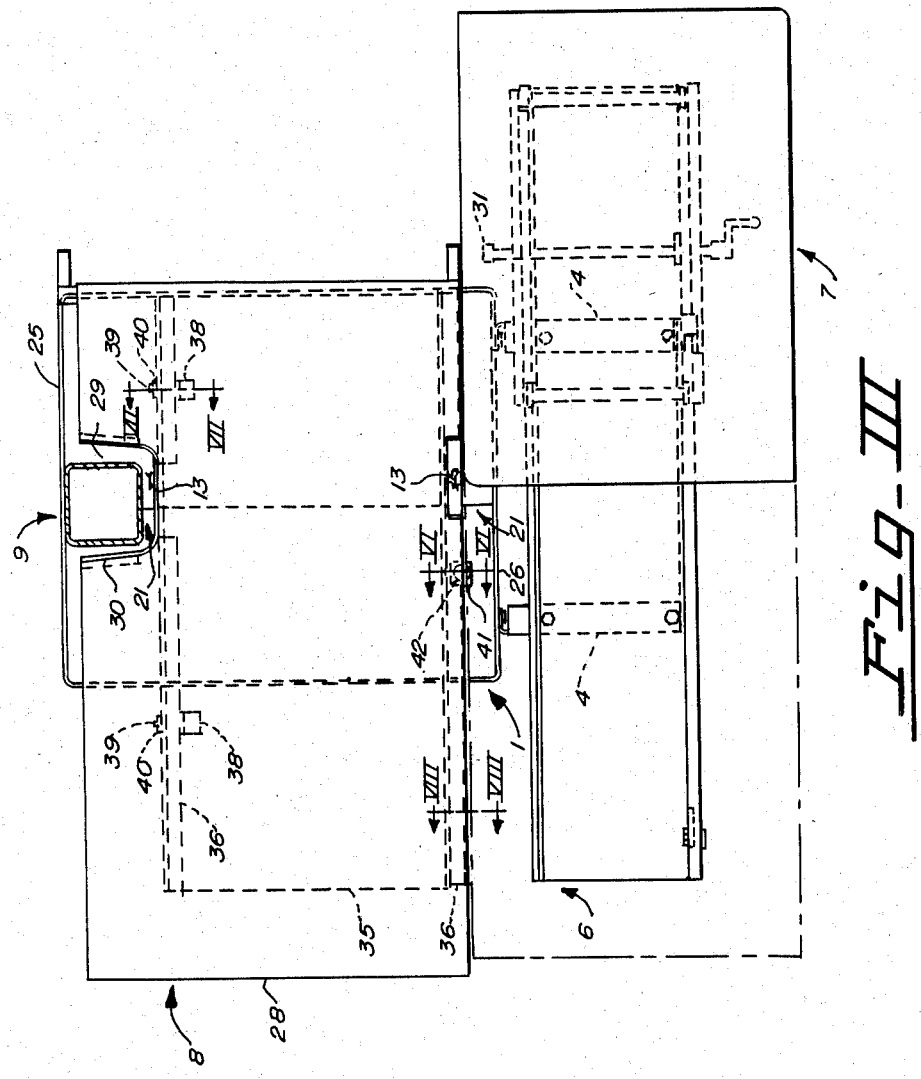

Jan. 20, 1959 J. D. BROWN 2,869,595
TABLE FOR BAND SAWS
Original Filed Jan. 27, 1955 5 Sheets-Sheet 4
Fig. IV
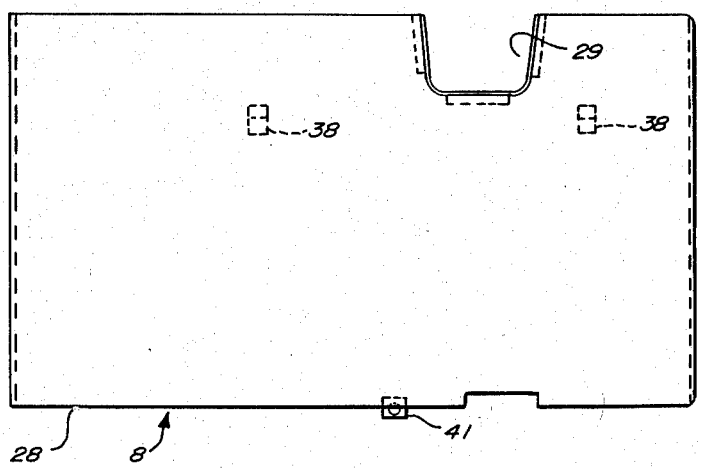
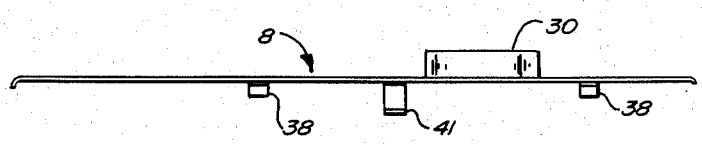
Fig. V
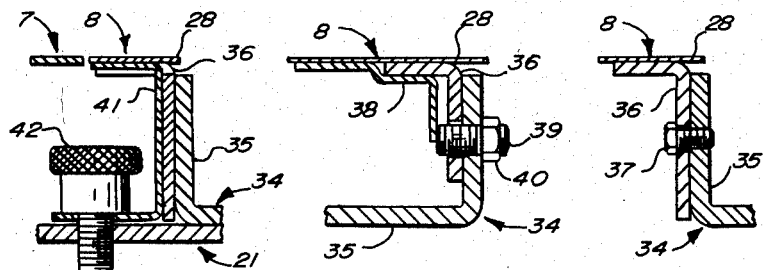
Fig. VIII
Fig. VII
Fig. VI
INVENTOR.
JAMES D. BROWN
BY
Marshall, Marshall & Yeasting
ATTORNEYS Jan. 20, 1959  J. D. BROWN  2,869,595
TABLE FOR BAND SAWS
Original Filed Jan. 27, 1955  5 Sheets-Sheet 5
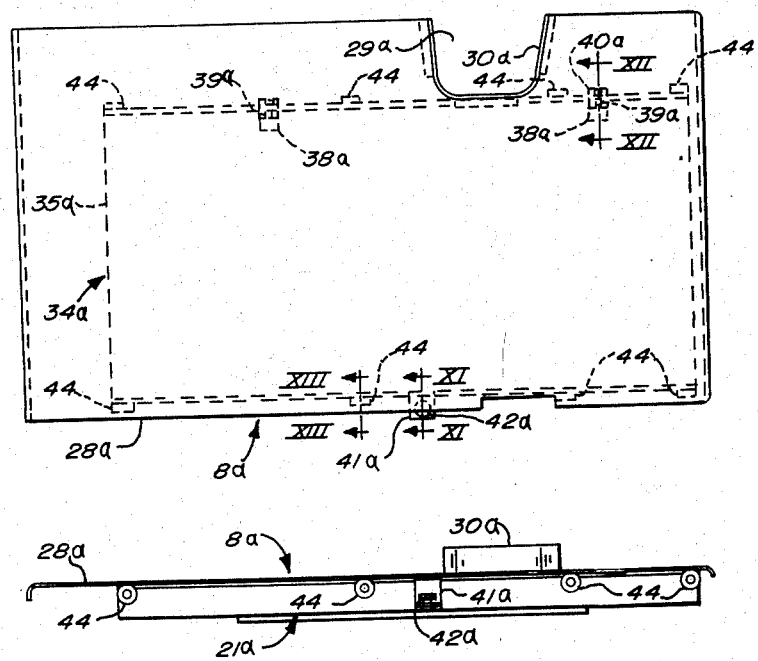
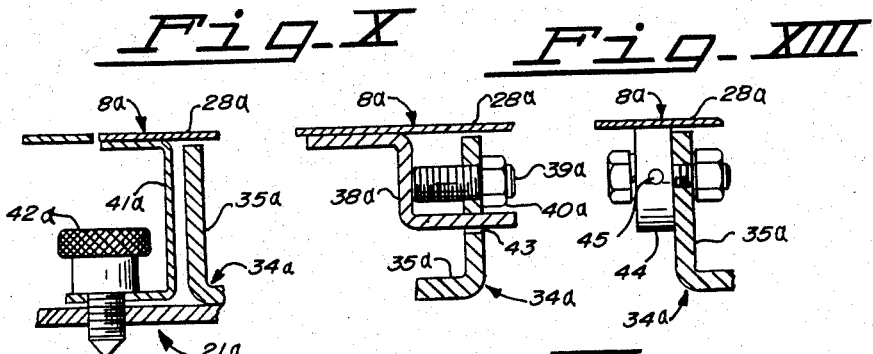
INVENTOR.
JAMES D. BROWN
BY
Marshall, Marshall & Yeasting
ATTORNEYS United States Patent Office 2,869,595
Patented Jan. 20, 1959

2,869,595

TABLE FOR BAND SAWS

James D. Brown, Toledo, Ohio, assignor, by mesne assignments, to Toledo Scale Corporation, Toledo, Ohio, a corporation of Ohio Original application January 27, 1955, Serial No. 484,369, now Patent No. 2,814,318, dated November 26, 1957. Divided and this application December 21, 1955, Serial No. 554,511

4 Claims. (Cl. 143—132)

This invention relates generally to improvements in meat cutting band saws of the type employed in places where large quantities of meat are cut from carcass or part carcass pieces.

The principal object of this invention is to provide a meat cutting band saw having improved operating characteristics yet being of very low cost construction.

Another object of the invention is to provide, in a meat cutting band saw, a stationary work table which is very easily removable from and positionable on a supporting base housing and so shaped as to permit easy removal and replacement of a band saw blade, the stationary table and the support therefor being of low cost construction.

More specific objects and advantages are apparent from the following description of preferred embodiments of the invention.

According to the invention, a meat cutting band saw is provided with a stationary work table that covers a partially open topped base housing and that is removably clipped on its one side to a support and releasably locked on its other side to the base housing, the table being so shaped as to permit easy removal and replacement of a band saw blade. The stationary table is so constructed and the general arrangement of the parts of the machine is such as to greatly reduce the cost of manufacture of the meat cutting band saw.

Preferred embodiments of the invention are illustrated in the accompanying drawings:

In the drawings:

Figure I is an end elevational view of a meat cutting band saw embodying the invention, certain adjuncts being removed to reveal inner parts.

Figure II is a simplified vertical sectional view showing the general construction of the machine illustrated in Figure I.

Figure III is a plan view taken substantially from the position shown by the line III—III of Figure I, part being shown in section.

Figure IV is a plan view of a stationary table taken substantially from the position shown by the line III—III of Figure I.

Figure V is a front elevational view of the stationary table illustrated in Figure IV.

Figure VI is a vertical sectional view taken along the line VI—VI of Figure III.

Figure VII is a vertical sectional view taken along the line VII—VII of Figure III.

Figure VIII is a vertical sectional view taken along the line VIII—VIII of Figure III.

Figure IX is a plan view of a modified stationary table and a support therefor, the view being similar to that part of Figure III illustrating a stationary table.

Figure X is a front elevational view of the stationary table and the support therefor shown in Figure IX.

Figure XI is a vertical sectional view taken along the line XI—XI of Figure IX.

Figure XII is a vertical sectional view taken along the line XII—XII of Figure IX.

Figure XIII is a vertical sectional view taken along the line XIII—XIII of Figure IX.

These specific figures and the accompanying description are intended merely to illustrate the invention and not to limit its scope.

The meat cutting band saw generally illustrated in Figures I and II has a base housing 1 erected on four short legs 2 two of which have leveling nuts 3 parallel with the bottom surfaces of the legs. Forwardly supporting bracket members 4, both of which are shown in Figure III, interconnected by means of a plate 5, are fixed to the base housing 1 and carry a pair of tracks 6 on which a movable table 7 is mounted to reciprocate. The top of the base housing 1 is formed by a stationary table 8 which lies on the same plane as the movable table 7 forming with the movable table a working surface for handling the meat to be cut on the machine.

At the rear center portion of the base housing 1 there is erected a hollow vertically upstanding column 9 atop which is located a saw wheel housing 10. An upper saw wheel 11 is rotatably mounted in the saw wheel housing 10 and a lower saw wheel 12 is rotatably mounted in the base housing 1, the saw wheels 11 and 12 being identical and preferably of the crown grooved type. A continuous band saw blade 13 runs on the saw wheels 11 and 12 passing upwardly near the outer front surface of the column 9 and downwardly across a throat formed between the underside of the saw wheel housing 10 and the stationary table 8. The rearward stretch of the band saw blade 13 is enclosed by a saw guard 14 attached to the column 9. A driving motor 15 is mounted in the base housing 1 and is drivingly connected to the lower saw wheel 12 by a drive belt 16. A thickness gauge plate 17 is mounted for fore and aft movement along the right hand side of the stationary table 8 back of the cutting plane of the blade 13 so that by setting the position of the gauge plate 17 relative to the blade 13 slices of meat of desired thickness may be cut.

The base housing 1 is constructed of sheet metal sections welded into a rectilinear hollow body. The upper right side of the base housing 1 is closed by an access door 18 and the upper left side of the base housing is closed by an access door 19 (Figure II). Opening of the doors gives access to the interior of the base housing 1 which is compartmented. At the upper right hand portion of the base housing 1 there is located a wheel compartment 20 (Figure II) formed of a Z-shaped section 21 having a flat bottom 22 and an inside wall 23 in which is cut a circularly shaped opening 24 and to which Z-shaped section 21 is attached a rectangularly shaped back plate 25 (Figure I) and a similarly shaped front plate 26 forming the back and front sides of the base housing 1. One of the four legs 2 is attached to each of the lower corners of the back plate 25 and one of the legs is attached to each of the lower corners of the front plate 26, as shown in Figure I, there being additional sections 27 interconnecting the lower portions of the plates 25 and 26 and attached to the legs, as shown in Figure II.

One of the features of the improved meat cutting band saw contributing to its very low cost is the construction of the improved stationary table 8 and the support therefor. Although both the table and its support are made from economical flat stock by a low cost bending process, the table is very easily removable and positionable on its support and is so shaped as to permit easy removal and replacement of the band saw blade 13. The stationary table 8, illustrated in detail in Figures IV–VIII, overlies the base housing 1 and forms a flat top on the housing.

The stationary table 8 includes a plate 28, preferably of stainless steel or other smooth durably finished material, having an opening 29 around which is attached an upstanding shield 30 enclosing the front and sides of the column 9 and the rearward stretch of the saw blade 13, but spaced apart therefrom. When the saw blade 13 is replaced, a collar 31 (Figure III) is disengaged from the end of a shaft 32, used to shift the gauge plate 17, the access door 18 of the base housing 1 is opened, a cover 33 (Figure II) on the saw wheel housing 10 is opened, the top of the saw blade is placed around the periphery of the upper saw wheel 11, the forward stretch of the saw blade is passed between the collar 31 and the end of the shaft 32, the bottom of the saw blade is placed around the periphery of the lower saw wheel 12 and the rearward stretch of the saw blade is passed around the back of the stationary table 8 and through the opening 29 in the table 8. This method of replacing or, when reversed, removing the saw blade 13 is very easy and requires a minimum number of movements on the part of the operator.

The stationary table 8 is supported by a table support 34 (Figure II) carried by the top of the Z-shaped section 21 of the base housing 1, the table support 34 including a channel member frame 35 (Figures VI to VIII) having two upstanding sides and a pair of L-shaped brackets 36 fixed to the upstanding sides by cap screws 37, one of which is shown in Figure VIII, and extending along each of the upstanding sides, upon which brackets 36 the plate 28 of the table 8 bears. A plurality of clips 38 are attached to the underneath side of the table 8 and engage a portion of one of the brackets 36 to hold the table down; and adjustable thrust screws 39, locked in place by lock nuts 40, extending through those of the brackets 36 engaging the clips cooperate with the clips for positioning the table relative to the channel member frame 35. After the table 8 is properly positioned by the thrust screws 39, the table is locked to the top of the Z-shaped section 21 of the base housing 1 by hold down means comprising a hold down clip 41 fixed to the underneath side of the table and a thumb screw 42 extending through a hole in the hold down clip and threaded into the top of the Z-shaped section 21 of the base housing 1. To remove the table 8 from the machine, the thumb screw 42 is loosened, the clips 38 disengaged from the bracket 36 and the table 8 lifted from its place.

A modification of the stationary table 8 and the support therefor is illustrated in Figures IX–XIII. This table has all the advantages of the table 8 hereinbefore described and in addition has adjusting means for leveling the table 8 when the low cost, mass-produced sheet metal sections from which the table and the support therefor are made are not properly in alignment with each other.

A modified stationary table 8a includes a plate 28a having an opening 29a around which is attached an upstanding shield 30a. The table 8a is supported by a table support 34a comprising a channel member frame 35a having two upstanding sides. A plurality of clips 38a are attached to the underneath side of the table 8a and cooperate with openings 43 in one of the upstanding sides of the frame 35a to hold the table down. A plurality of circularly shaped members 44 are adjustably and eccentrically mounted along the upstanding sides of the frame 35a and support the front and back edges of the table 8a. When the table 8a is to be attached to the machine, the clips 38a are inserted in their cooperating openings 43 in the frame 35a and a pair of adjustable thrust screws 39a, threaded through the frame 35a and locked in place by lock nuts 40a, are adjusted to position the table relative to the table support 34a. The circularly shaped and eccentrically mounted members 44 are then turned by means of a tool (not shown) inserted in holes 45, one of which is shown in Figure XIII, to level the table 8a to accommodate poorly aligned parts. Thus, even if the plate 28a of the table 8a or if the channel member frame 35a happen to be crooked, compensation for the poor alignment can be made by leveling the table by means of the eccentrically mounted members 44. After the table 8a is properly positioned by the thrust screws 39a and leveled by the eccentrically mounted members 44, the table is locked to the top of a Z-shaped section 21a of a base housing by hold down means comprising a hold down clip 41a fixed to the underneath side of the table and a thumb screw 42a extending through a hole in the hold down clip and threaded into the top of the Z-shaped section 21a.

The embodiments of the invention that have been disclosed may be modified to meet various requirements.

This application is a division of application Serial No. 484,369, filed January 27, 1955, issued November 26, 1957 as Patent No. 2,814,318.

Having described the invention, I claim:

1. In a meat cutting band saw, in combination, a base, a table support that comprises a channel member having two upstanding sides and that is carried by the base, a stationary table carried by the table support above said upstanding sides, a stop member adjustably attached to the table support for selective movement in a path which generally is parallel to the plane of the table, a finger attached to the underneath side of the table and engaging a portion of the table support for holding down one side of the table, the horizontal position of the table being determined by engagement of the finger with the stop member, and means for holding down the other side of the table after its horizontal position has been determined by engagement of the finger with the stop member.

2. In a meat cutting band saw, in combination, a base, a frame that has two upstanding sides each having a generally horizontally disposed shelf-like upper edge and that is carried by the base, a stationary table supported by the upper surfaces of the shelf-like edges of the frame, a stop member adjustably attached to the frame for selective movement in a path which generally is parallel to the plane of the table, a finger attached to the underneath side of the table and engaging the underneath side of one of the shelf-like upper edges of the frame for holding down one side of the table, the horizontal position of the table being determined by engagement of the finger with the stop member, and means for holding down the other side of the table after its horizontal position has been determined by engagement of the finger with the stop member.

3. In a meat cutting band saw, in combination, a base, a table support carried by the base, a plurality of eccentrically pivoted circular members adjustably attached to the table support for selective movement about their pivotal axes whereby each of the upper surfaces of the circular members selectively can be raised or lowered independently of all of the other circular members, a stationary table carried on said upper surfaces of the circular members, a stop adjustably attached to the table support for selective movement in a path which generally is parallel to the plane of the table, the horizontal position of the table relative to the table support being determined by engagement of the table with the stop, and means for holding the table down on said upper surfaces of the circular members after the table has been horizontally positioned by engagement with the stop and leveled by means of the circular members.

4. In a meat cutting band saw, in combination, a base, a frame having upstanding sides carried by the base, one of the upstanding sides having at least one opening therethrough, a plurality of eccentrically pivoted circular members adjustably attached to the upstanding sides of the frame for selective movement about their pivotal axes whereby each of the upper surfaces of the circular members selectively can be raised or lowered independently of all of the other circular members, a stationary table that is carried on said upper surfaces of the circular members and that has fixedly attached to its underneath side a finger for each opening in the upstanding side, each finger extending through the corresponding opening in the upstanding side to hold one side of the table down on said upper surfaces of the circular members, a stop adjustably attached to the frame for selective movement in a path which generally is parallel to the plane of the table, the horizontal position of the table relative to the frame being determined by engagement of the finger with the stop, and means for holding the other side of the table down on said upper surfaces of the circular members after the table has been horizontally positioned by engagement of the finger with the stop and leveled by means of the circular members.

References Cited in the file of this patent

UNITED STATES PATENTS

| | | |
|---|---|---|
| 225,323 | Bennett | Mar. 9, 1880 |
| 775,477 | Norlin | Nov. 22, 1904 |
| 1,482,631 | De Linieres | Feb. 5, 1924 |
| 2,329,345 | Gardner | Sept. 14, 1943 |
| 2,343,243 | Roemer | Mar. 7, 1944 |
| 2,435,765 | Anderson | Feb. 10, 1948 |
| 2,585,957 | Meeker et al. | Feb. 19, 1952 |
| 2,590,119 | Osterhus | Mar. 25, 1952 |